United States Patent
Kojima et al.

(10) Patent No.: US 9,172,824 B2
(45) Date of Patent: Oct. 27, 2015

(54) APPARATUS, SYSTEM, AND METHOD OF INSPECTING IMAGE, AND RECORDING MEDIUM STORING IMAGE INSPECTION CONTROL PROGRAM

(71) Applicants: Keiji Kojima, Kanagawa (JP); Hiroyoshi Ishizaki, Kanagawa (JP); Tadashi Kitai, Kanagawa (JP); Hitomi Kaneko, Saitama (JP); Hiroyuki Kawamoto, Kanagawa (JP); Keiichi Miyamoto, Kanagawa (JP)

(72) Inventors: Keiji Kojima, Kanagawa (JP); Hiroyoshi Ishizaki, Kanagawa (JP); Tadashi Kitai, Kanagawa (JP); Hitomi Kaneko, Saitama (JP); Hiroyuki Kawamoto, Kanagawa (JP); Keiichi Miyamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/790,581

(22) Filed: Mar. 8, 2013

(65) Prior Publication Data

US 2013/0250370 A1    Sep. 26, 2013

(30) Foreign Application Priority Data

Mar. 21, 2012 (JP) ................... 2012-063765

(51) Int. Cl.
*H04N 1/00* (2006.01)
*H04N 1/40* (2006.01)
*G06K 9/03* (2006.01)

(52) U.S. Cl.
CPC ............ *H04N 1/00005* (2013.01); *G06K 9/033* (2013.01); *H04N 1/00047* (2013.01); *H04N 1/00087* (2013.01); *H04N 1/40* (2013.01)

(58) Field of Classification Search
None
See application file for complete search history.

(56) References Cited

U.S. PATENT DOCUMENTS

| | | | |
|---|---|---|---|
| 2011/0075890 A1* | 3/2011 | Yasuda et al. | 382/112 |
| 2011/0134458 A1 | 6/2011 | Kojima et al. | |
| 2012/0008168 A1* | 1/2012 | Danner | 358/1.15 |
| 2012/0121139 A1 | 5/2012 | Kojima et al. | |

FOREIGN PATENT DOCUMENTS

| | | | |
|---|---|---|---|
| AU | 2008264171 | * | 7/2010 |
| AU | 2008264171 A1 | | 7/2010 |
| EP | 2312530 A1 | | 4/2011 |
| JP | 3-281276 | | 12/1991 |
| JP | 11-078183 | | 3/1999 |
| JP | 2005-041122 | | 2/2005 |
| JP | 2005-74762 | | 3/2005 |
| JP | 2010-165011 | | 7/2010 |

OTHER PUBLICATIONS

European Search Report dated Jun. 19, 2013 in corresponding European Patent application No. 13 15 8073.0.

* cited by examiner

*Primary Examiner* — Helen Q Zong
(74) *Attorney, Agent, or Firm* — Cooper & Dunham LLP

(57) ABSTRACT

An apparatus, system, method, and non-transitory recording medium storing an image inspection control program, each of which is capable of inspecting a printed image are provided. While generating an inspection image to be used for inspecting a read image obtained by reading the printed image, attribute data indicating, for each pixel in the inspection image, whether the pixel belongs to drawing data in the inspection image is generated. The attribute data is used to process inspection of the read image based on comparison between the read image and the inspection image.

16 Claims, 6 Drawing Sheets

| $P_{11}$ | $P_{12}$ | $P_{13}$ | $P_{14}$ |
|---|---|---|---|
| $P_{21}$ | $P_{22}$ | $P_{23}$ | $P_{24}$ |
| $P_{31}$ | $P_{32}$ | $P_{33}$ | $P_{34}$ |
| $P_{41}$ | $P_{42}$ | $P_{43}$ | $P_{44}$ |

| $P_{11}$ | $P_{12}$ | $P_{13}$ | $P_{14}$ | ... | $P_{21}$ | $P_{22}$ | $P_{23}$ | $P_{24}$ | ... | $P_{41}$ | $P_{42}$ | $P_{43}$ | $P_{44}$ | ... |

FIG. 10
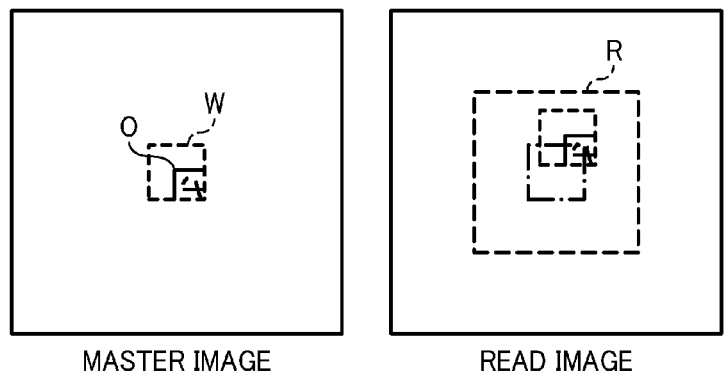
MASTER IMAGE     READ IMAGE
FIG. 11
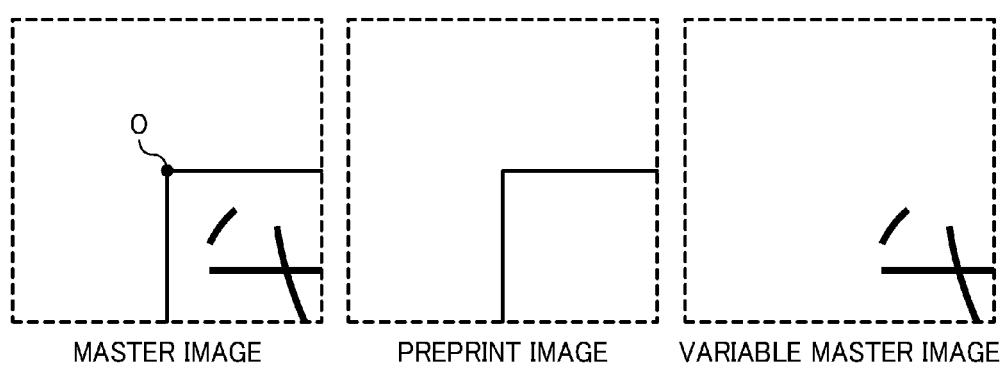
MASTER IMAGE     PREPRINT IMAGE     VARIABLE MASTER IMAGE
FIG. 12
PREPRINT IMAGE
X : xxxx
Y : xxxx
DIFFERENCE : xxxx
VARIABLE MASTER IMAGE
X : xxxx
Y : xxxx
DIFFERENCE : xxxx
FIG. 13
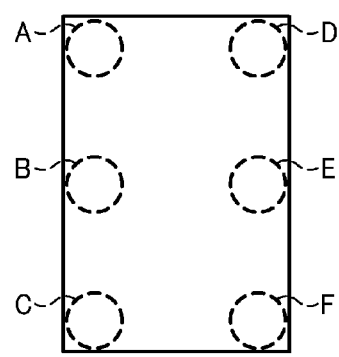

APPARATUS, SYSTEM, AND METHOD OF INSPECTING IMAGE, AND RECORDING MEDIUM STORING IMAGE INSPECTION CONTROL PROGRAM

CROSS-REFERENCE TO RELATED APPLICATIONS

This patent application is based on and claims priority pursuant to 35 U.S.C. §119 to Japanese Patent Application No. 2012-063765, filed on Mar. 21, 2012, in the Japan Patent Office, the entire disclosure of which is hereby incorporated by reference herein.

BACKGROUND

1. Field of the Invention

The present invention relates to an apparatus, system, and method of inspecting an image and a non-transitory recording medium storing an image inspection control program, and more specifically, to inspecting an image formed on a recording sheet using attribute data.

2. Description of the Related Art

Conventionally, inspection of printed matter is performed by human operators. In recent years, an inspection apparatus that automatically inspects printed matter is widely used, mainly in the field of offset printing. For example, a master image is generated by reading specific printed matter that is selected based on the image quality, as a reference image. The corresponding portions of the master image and a read image of printed matter are compared to determine, by the degree of difference therebetween, whether there is a defect in the printed matter.

The printing apparatus, such as electrophotographic apparatus, is widely used to print a small number of pages. For example, the printing apparatus may perform variable printing in which the contents to be printed differ in each page. In such case, comparing the printed matter, with the master image generated from the printed matter, would be inefficient. In view of this, a master image may be generated based on print data to be output as a printed image of printed matter.

When the image is printed on a blank recording sheet, a read image obtained by reading the printed image can be compared with a master image to inspect the read image. In case of preprint printing, in which data of a variable image that varies from sheet to sheet is printed on a preprint sheet, that is, the recording sheet having a previously printed image ("preprint image") such as rule lines or template statements, the read image cannot be simply compared with the master image. Since the read image includes the preprint image and the variable image, it cannot be simply compared with the master image generated based on the variable image data.

In view of this, Japanese Patent Application Publication No. H03-281276-A proposes an image inspection method, in which a master image is generated by combining a preprint image and a variable image, and compared with a read image.

Japanese Patent Application Publication No. H11-78183-A describes an inspection method, in which a preprint image layer of a read image is masked to generate a read image having only a variable image. The read image is then compared with a master image of variable image to inspect a defect.

Japanese Patent Application Publication No. 2005-41122-A proposes an inspection method, in which the difference between a read image and a preprint image is compared with a variable image to inspect the variable image.

SUMMARY

When forming an image on a recording sheet, the position on the recording sheet on which the image is formed may be shifted, causing a registration shift. This registration shift, even the shift in a few pixels that is not recognizable by the human eye, may have negative influences in image inspection.

When inspecting the image based on comparison between the pixels in the master image and the pixels in the read image, the master image and the read image need to be matched in their positions. If the image is formed on a blank recording sheet, as long as the read image and the master image match in their positions, the read image can be correctly inspected.

Assuming that the registration shift occurs when the variable image is formed on the preprint sheet, the position of the variable image would be shifted with respect to the preprint image previously formed on the recording sheet. In such case, the master image and the read image would have different images such that it would be difficult to match the positions of the images. Further, even if a defect is detected in the image, it would be difficult to automatically detect whether the defect is in the preprint image or the variable image, thus making difficult to notify the user of detection of the defect.

If the preprint image layer of the master image can accurately be masked, for example, using the technique described in Japanese Patent Application Publication No. H11-78183-A, image inspection can be successfully performed. If any portion in the preprint image layer is not masked, that portion may be detected as a defect in the read image. Further, in case the preprint image layer and the variable image layer are closely located in their positions, a portion in the variable image layer may be masked, thus causing an error in detection of a defect.

While the technique described in Japanese Patent Application Publication No. 2005-41122-A also has a drawback as described above, it additionally requires the longer processing time and the higher manufacturing cost. For example, in order to inspect the read image, the difference value in pixel with the master image is calculated for a plurality of times, thus increasing the processing time. While calculation can be performed concurrently to reduce the overall processing time, a number of processing logics is needed. Further, various data need to be stored such as master images that are generated respectively for the preprint image and the variable image, and differential data that are obtained through a plurality of stages of calculation, thus requiring a larger memory size.

In view of the above, one object according to an example embodiment of the present invention is to provide an apparatus, system, method, and a non-transitory recording medium storing an image inspection control program, each of which is capable of inspecting a printed image based on comparison between a read image obtained by reading the printed image and an inspection image, with the improved accuracy and the simple configuration.

For example, even when an image, such as an output target image, is formed on a recording sheet having a previously printed image, such as a preprint sheet, the positions of the read image and the inspection image can accurately and easily be matched.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is an illustration for explaining operation of performing pattern matching so as to match the positions of the master image and the read image, performed by the inspection apparatus of FIG. 3, according to an example embodiment of the present invention;

FIG. 11 is an illustration for explaining operation of matching the positions of the images using attribute data, according to an example embodiment of the present invention;

FIG. 12 is an illustration for explaining position match results of the read image with respect to the preprint image and the variable master image, according to an example embodiment of the present invention;

FIG. 13 is an illustration for explaining an area of the image from which a reference point is extracted, according to an example embodiment of the present invention;

Figure 1:
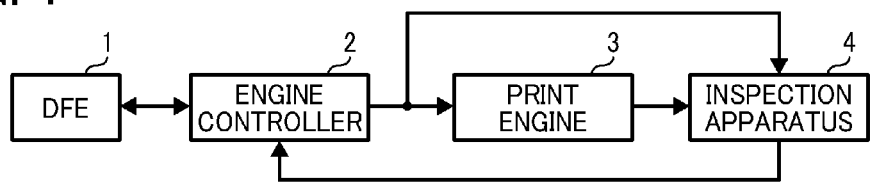
FIG. 1 is a schematic block diagram illustrating an image forming system including an inspection apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following examples, an image forming system including an inspection apparatus that inspects a printed image is described. More specifically, the printed image includes a variable image formed on a recording sheet having a preprint image. The variable image is an image generated based on information specific to each document, such as the image generated based on form data. The preprint image is any image that is previously printed onto the recording sheet, such as rule lines.

Further, in the following examples, the variable image may correspond to as data that causes the print engine 3 to output a variable image, or the variable image being output. The preprint image may correspond to as data that causes the print engine 3 to output a preprint image, the preprint image being output, or a preprint layer of the master image to be used for inspection. The variable master image may correspond to as data of a variable master image, or a variable data layer, of the master image to be used for inspection. The master image, which is generated by combining the variable master image and the preprint image, may correspond to as data of a master image to be used for inspection.

FIG. 1 illustrates an entire configuration of an image forming system. The image forming system of FIG. 1 includes a digital front end (DFE) 1, an engine controller 2, a print engine 3, and an inspection apparatus 4. The DFE 1 generates bitmap data of image data to be output according to a print job received from the outside, and outputs the bitmap data to the engine controller 2.

The engine controller 2 controls the print engine 3 based on the bitmap data received from the DFE 1 to output a printed image. The engine controller 2 further inputs the bitmap data as variable image data to be used for generating master image data ("the master image"), to the inspection apparatus 4.

The print engine 3 forms an image on a recording sheet based on the bitmap data under control of the engine controller 2, reads the printed image using a reading device 302 to generate read image data, and inputs the read image data to the inspection apparatus 4 as a read image. Further, in this example, the print engine 3 scans a preprint sheet into preprint image data, and inputs the preprint image data to the inspection apparatus 4 as a preprint image. The preprint image is used for inspection of the printed image.

The inspection apparatus 4 generates the master image to be used for inspecting the output result of the print engine 3, based on the variable image data input from the engine controller 2 and the preprint image data. The inspection apparatus 4 compares the read image read from the printed image output from the print engine 3, with the master image, to inspect the printed image. In generating the master image, the inspection apparatus 4 generates, for each image pixel to be included in the master image, attribute data indicating whether the pixel is an element of the variable image or an element of the preprint image.

Figure 2:
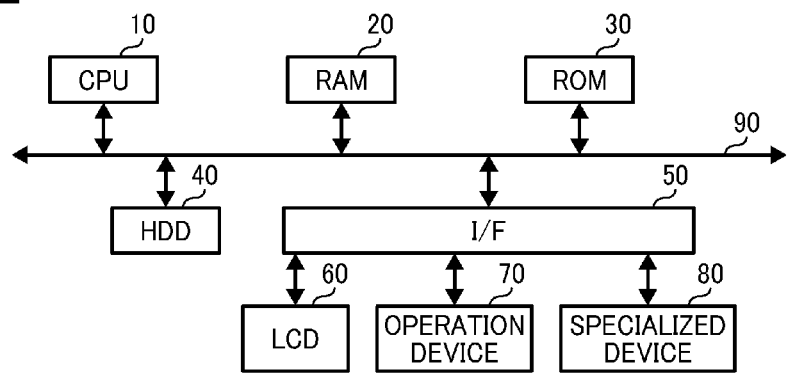
FIG. 2 is a schematic block diagram illustrating a hardware structure of a control section of any one of an engine controller, a print engine, and the inspection apparatus of FIG. 1, according to an example embodiment of the present invention.

Referring now to FIG. 2, a hardware structure of the inspection apparatus 4 is explained according to an example embodiment of the present invention.

As illustrated in FIG. 2, the inspection apparatus 4 is implemented by an information processing apparatus such as a personal computer or a server computer. The inspection apparatus 4 includes a central processing unit (CPU) 10, a random access memory (RAM) 20, a read only memory (ROM) 30, a hard disk drive (HDD) 40, and an interface (I/F) 50, which are connected through a bus 90. The inspection apparatus 4 further includes a liquid crystal display (LCD) 60, an operation device 70, and a specialized device 80, which are connected to the I/F 50.

The CPU 10 is implemented by a processor such as a microprocessor, which is capable of controlling entire operation of the inspection apparatus 4. The RAM 20 is implemented by a volatile memory that writes various data thereto or reads various data therefrom with relatively high speeds. The RAM 20 may be used as a work memory area of the CPU 10. The ROM 30 is implemented by a nonvolatile memory from which various data is read. The ROM 30 may store various programs such as firmware. The HDD 40 is implemented by a nonvolatile memory from which various data is read. The HDD 40 may store various control programs such as an operating system (OS), and application programs such as the inspection control program.

The I/F 50 allows various hardware devices to be connected through the bus 90 or to the outside through a network, and controls these connections. The LCD 60 functions as a user interface, which allows a user to visually check status of the inspection apparatus 4. The operation device 70 functions as a user interface, which allows the user to input various data to the inspection apparatus 4 using, for example, a keyboard or a mouse. The LCD 60 and the operation device 70 may be integrated into one device, for example, in the form of a touch panel screen.

The specialized device 80 is a hardware device that causes the information processing apparatus of FIG. 2 to additionally have specialized functions to cause the information processing apparatus to function as the inspection apparatus 4. More specifically, with the specialized device 80, the CPU 10 converts the binary image into the multivalue image to generate the master image, or compares the master image with the read image of the printed image. The specialized device 80 may be implemented by, for example, Application Specific Integrated Circuit (ASIC) capable of performing image processing with relatively high processing speeds.

The specialized functions of the inspection apparatus 4 may be alternatively implemented by software, such as the inspection control program that is stored in a memory such as the ROM 30, HDD 40, or any desired recording medium such as an optical disc. When executed by the CPU 10, the inspection control program may be read onto the RAM 20 to cause the CPU 10 to control various hardware devices of FIG. 2 according to the control program.

Alternatively, the specialized functions of the inspection apparatus 4 may be realized by a combination of software and hardware such as a combination of the inspection control program and the ASIC of the specialized device 80.

The control section of the print engine 3 is substantially similar in hardware structure to the inspection apparatus 4 of FIG. 2, except for the specialized device 80. The specialized device 80 causes the information processing apparatus of FIG. 2 to additionally have specialized functions such that the information processing apparatus functions as the print engine 3. More specifically, the specialized device 80 of the print engine 3 includes a plotter that forms a printed image on a recording sheet, and a reading device that reads the printed image into read image data.

The control section of the engine controller 2 is substantially similar in hardware structure to the inspection apparatus 4 of FIG. 2, except for the specialized device 80. The specialized device 80 causes the information processing apparatus of FIG. 2 to additionally have specialized functions such that the information processing apparatus functions as the engine controller 2. For example, the specialized device 80 causes the engine controller 2 to control forming of a printed image and inspecting of the printed image using the inspection apparatus 4.

Figure 3:
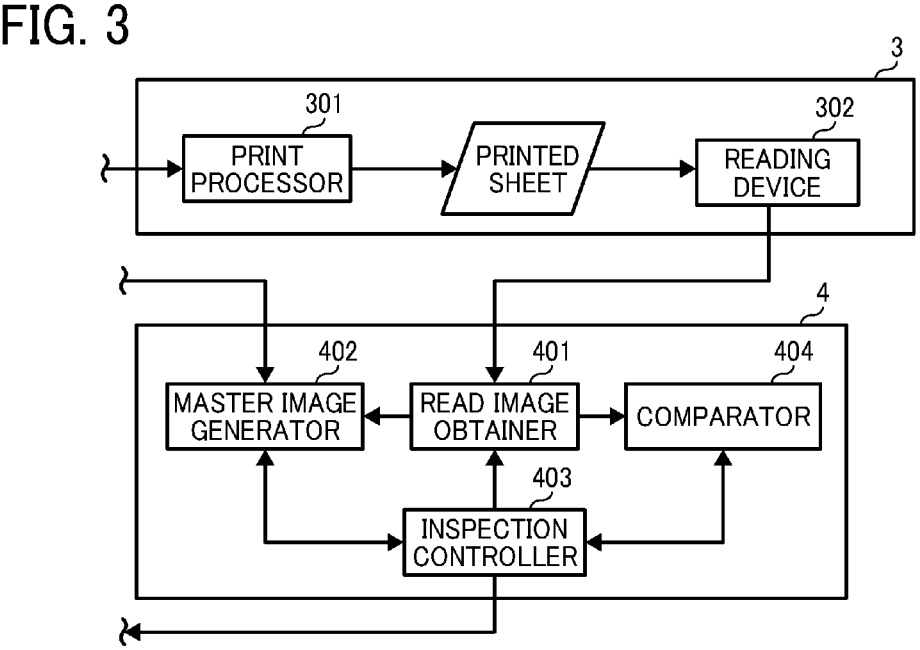
FIG. 3 is a schematic block diagram illustrating a functional structure of the print engine and the inspection apparatus of FIG. 1, according to an example embodiment of the present invention.

FIG. 3 illustrates a schematic block diagram illustrating functional structures of the print engine 3 and the inspection apparatus 4, according to an example embodiment of the present invention. As illustrated in FIG. 3, the print engine 3 includes a print processor 301 and the reading device 302. The inspection apparatus 4 includes a read image obtainer 401, a master image generator 402, an inspection controller 403, and a comparator 404.

The print processor 301 obtains the bitmap data input from the engine controller 2, and forms an image on a recording sheet based on the bitmap data to output the recording sheet having a printed image. In this example, the print processor 301 is implemented by an image forming device that forms an image using the electrophotographic method, such as a tandem-type image forming device. Alternatively, the print processor 301 may be implemented by any other desired image forming device such as an inkjet printer.

The reading device 302 reads the printed image formed on the recording sheet, which is output from the print processor 301, into read image data ("read image"), and outputs the read image to the inspection apparatus 4. In this example, the reading device 302 may be implemented by a line scanner, which is provided in the print engine 3 such that the reading device 302 can scan the printed image formed on the recording sheet as the recording sheet is transferred and output from the print engine 3. For example, the reading device 302 may be disposed along a transfer passage through which the recording sheet is transferred. As the recording sheet is being transferred, the reading device 302 reads the printed image formed on the recording sheet by scanning the surface of the recording sheet. Further, the reading device 302 scans the preprint sheet into a preprint image, and outputs the preprint image to the inspection apparatus 4. As described above, the preprint sheet is a recording sheet having the previously printed image, which is referred to as the preprint image.

The read image obtainer 401 obtains the read image, generated by the reading device 302 based on the printed image formed on the recording sheet, and inputs the read image to the comparator 404 as a subject for inspection. The read image obtainer 401 inputs the preprint image obtained from the reading device 302 to the master image generator 402.

The master image generator 402 obtains the variable image input from the engine controller 2, and the preprint image input from the read image obtainer 401, to generate a master image to be used for inspecting the read image that reflects the printed image. The master image generator 402 generates attribute data indicating whether each pixel in the master image belongs to the preprint image or the variable image, in a data format that is the same as a data format of the image data such as the bitmap data. More specifically, the data format of the attribute data is determined such that arrangement of the respective image pixels is kept the same between the master image and the attribute data. The functions or operation of the master image generator 402 will be described below in detail.

The inspection controller 403 controls an entire operation of the inspection apparatus 4, such that the units or devices included in the inspection apparatus 4 operate under control of the inspection controller 403.

The comparator 404 compares the read image input from the read image obtainer 401 with the master image generated by the master image generator 402 to determine whether the image formed by the print engine 3 ("the printed image") is in good quality as expected. More specifically, in the process of inspecting the read image that reflects the print image, the comparator 404 matches between the position of the master image and the position of the read image based on the attribute data, and compares between the master image and the read image using the attribute data. The comparator 404 may be implemented by the ASIC of the specialized device 80 such that the comparator 404 is able to compute a large amount of data with high speeds. Alternatively, the comparator 404 may be implemented by a processor that executes a control program stored in a memory.

Figure 4:
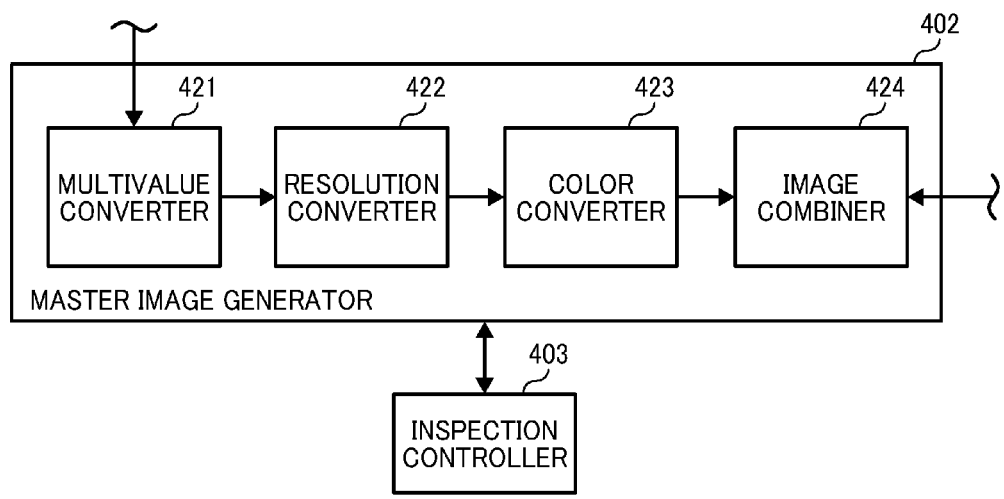
FIG. 4 is a schematic block diagram illustrating a functional structure of a master image generator of the inspection apparatus of FIG. 3, according to an example embodiment of the present invention.

Referring now to FIG. 4, a functional structure of the master image generator 402 is explained according to an example embodiment of the present invention. As illustrated in FIG. 4, the master image generator 402 includes a multivalue converter 421, a resolution converter 422, a color converter 423, and an image combiner 424. The master image generator 402 may be implemented by a hardware, such as the specialized device 80.

The multivalue converter 421 obtains the binary image from the engine controller 2, and converts the binary image into a multivalue image. In the binary image, each image pixel is expressed as colored (chromatic) or colorless (achromatic). In this example, the variable image is input to the print engine 3 in the form of binary image of each one of the colors including cyan, magenta, yellow, and black. On the other hand, the read image, subjected for inspection, is a multivalue image having tones for each color of the colors including red, green, and blue. The multivalue converter 421 converts the binary image into the multivalue image, such as the multivalue image in which each color of cyan, magenta, yellow, and black is expressed in 8-bit.

In this example, the print engine 3 outputs an image based on the binary image of C, M, Y, and K colors, and the multivalue converter 421 of the master image generator 402 converts the binary image into the multivalue image. Alternatively, the multivalue converter 421 does not have to be provided, if the print engine 3 outputs an image based on the multivalue image.

The resolution converter 422 applies resolution conversion to the multivalue image generated by the multivalue converter 421 to output a halftone image. The halftone image is a multivalue image in which each image pixel is expressed by eight bits of CMYK colors, with resolution of 200 dpi. The resolution converter 422 converts resolution of the multivalue image such that the converted multivalue image has a resolution that matches the resolution of the read image generated by the reading device 302.

The color converter 423 applies color conversion to the halftone image generated by the resolution converter 422 to generate a master image of the variable image data. More specifically, the color converter 423 converts the image input from the resolution converter 422, from CMYK to RGB. The master image of the variable image data is a multivalue image in which each image pixel is expressed by eight bits of RGB colors (total of 24 bits), with resolution of 200 dpi. In this manner, the multivalue image, i.e., the master image of the variable image data, has a data format that is equal to the data format of the read image generated by the reading device 302. The master image of the variable image data is referred to as the variable master image.

Figure 5:
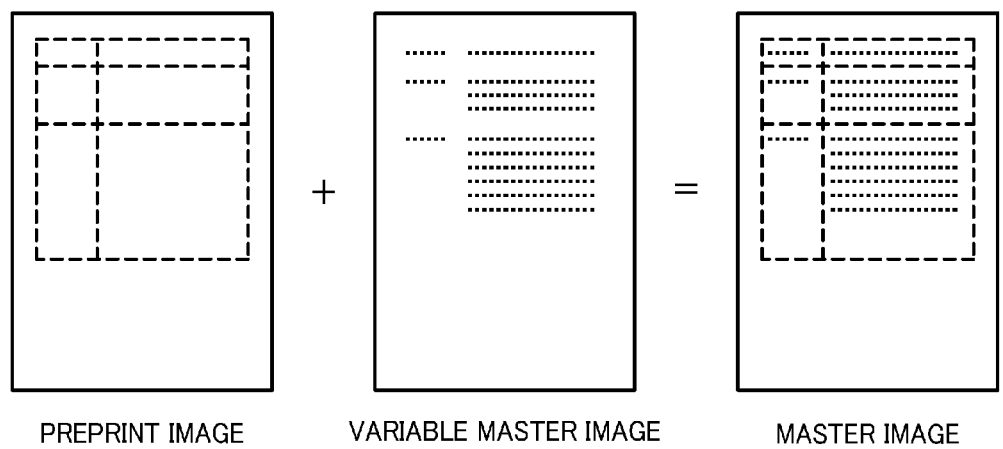
FIG. 5 is an illustration for explaining generation of a master image, performed by the master image generator of FIG. 4, according to an example embodiment of the present invention.

The image combiner 424 combines the preprint image, input from the read image obtainer 401, with the master image of the variable image data, to generate a master image, for example, as illustrated in FIG. 5. The image combiner 424 thus performs the function of generating an image to be used for inspecting the printed image, such as the master image.

Referring to FIG. 5, the variable master image and the preprint image each have a portion having drawing data including characters or graphics such as lines, and a portion having no drawing data. Once the variable master image and the preprint image are combined into the master image, it would be difficult to figure out which portion of the master image is based on the drawing data of the preprint image, and which portion of the master image is based on the drawing data of the variable master image.

In view of this, in the process of generating the master image, the image combiner 424 generates, for each pixel in the master image, attribute data indicating whether an image element drawn by the pixel belongs to drawing data of the variable master image or belongs to drawing data of the preprint image. The image combiner 424 stores the attribute data in the form of an attribute data plane, separately from the R, G, and B planes of the master image. In this example, the drawing data of the variable master image is a part of data being displayed, when the variable image is output as a printed image. The drawing data of the preprint image is a part of data being displayed, when the preprint image is output as a printed image.

If the attribute data plane is generated after generating the master image, the processing loads on the inspection apparatus 4 would increase if there is a need for finding out a source of each pixel in the mater image, as the inspection apparatus 4 needs to refer to the pixel value of each pixel in the master image. As described above, in this example, the image combiner 424 generates the attribute data plane for each pixel to be included in the master image, while performing operation of combining the variable master image and the preprint image. Since the pixel value of each pixel in the master image will be referred to while combining the variable master image and the preprint image, the inspection apparatus 4 would be able to efficiently generate the attribute data plane while utilizing operation of referring to the pixel value of each pixel in the variable master image and the preprint image in generating the master image.

More specifically, in this example, the image combiner 424, while generating the master image, outputs the result obtained by referring to the pixel value of each pixel in the variable master image or the preprint image. Further, in another example, the pixel value result, which is obtained through the process of generating the master image, may be used by any module, other than the image combiner 424, to generate the attribute data plane. The module that generates the attribute data may be provided inside or outside the master image generator 402, as long as it is accessible to the pixel value result output by the image combiner 424.

Figures 6, 7A, 7B:
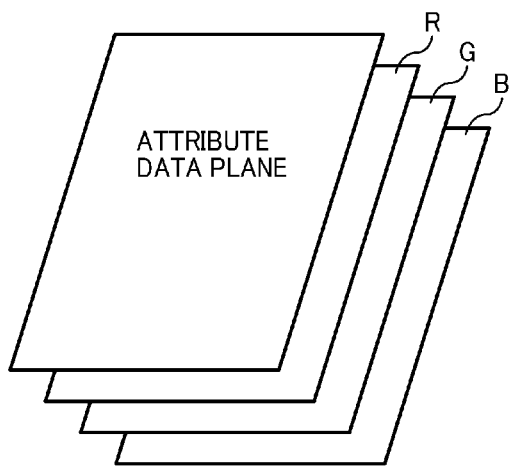
FIG. 6 is an illustration for explaining an attribute data plane and image data, according to an example embodiment of the present invention.
FIG. 7A is an illustration of a data structure of attribute data plane of FIG. 6, according to an example embodiment of the present invention.
FIG. 7B is an illustration of a data structure of attribute data plane of FIG. 6, according to an example embodiment of the present invention.

FIG. 6 illustrates the respective planes of the master image. The master image of FIG. 6 includes image data planes of the respective colors of R, G, and B, and the attribute data plane. The attribute data plane may be stored in the form of information regarding a format of the image data. Alternatively, the attribute data plane may be stored in the form of additional plane included in the bitmap data.

FIGS. 7A and 7B each illustrate a data structure of the attribute data plane of FIG. 6 according to example embodiments of the present invention. In FIGS. 7A and 7B, the attribute data plane includes a plurality of pixels P11 to Pxx (collectively referred to as the Pxx), which correspond to the respective pixels in the master image.

Referring to FIG. 7A, the attribute data Pxx are arranged in vertical and horizontal directions to form a matrix. The location at which attribute data Pxx for each pixel is stored is defined so as to associate with the location of each pixel in the master image.

In alternative to FIG. 7A, as illustrated in FIG. 7B, the attribute data plane may have a data structure such that the attribute data Pxx corresponding to the respective pixels in the master image may be arranged in an order defined by the arrangement of the respective pixels in the master image.

Figure 8:
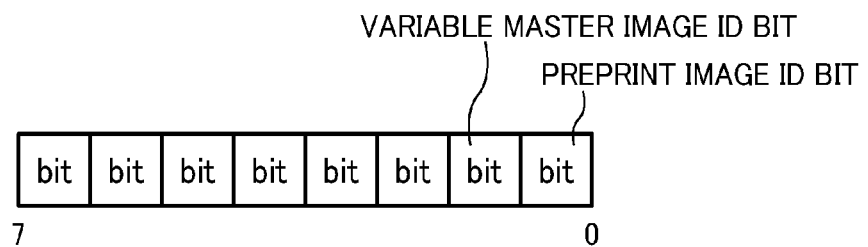
FIG. 8 is an illustration of a data structure of attribute data of FIG. 7A or 7B, according to an example embodiment of the present invention.

Referring now to FIG. 8, the contents of the attribute data Pxx is explained according to an example embodiment of the present invention. In this example, the attribute data Pxx contains an array of bits, which includes 8 bits, with the total of 1 byte. The first bit is referred to as the "preprint image identification (ID) bit", which indicates whether the pixel belongs to drawing data of the preprint image. When the preprint image ID bit has the value "0", the pixel is not included in the preprint image. When the preprint image ID bit has the value "1", the pixel is included in the preprint image. The second bit is referred to as the "variable master image ID bit", which indicates whether the pixel belongs to drawing data of the variable master image. When the variable master image ID bit has the value "0", the pixel is not included in the variable master image. When the variable master image ID bit has the value "1", the pixel is included in the variable master image.

In case the pixel belongs to the drawing data of the preprint image and the drawing data of the variable master image, the "preprint image ID bit" and the "master image ID bit" both have the value "1". In case there is no pixel value, the "preprint image ID bit" and the "master image ID bit" both have the value "0". The remaining 6 bits, out of 8 bits, may be assigned with any other attribute information. Alternatively, the one-byte data may store the attribute data of 4 pixels, each set of 2 bits respectively corresponding to the preprint image ID bit and the variable master image ID bit. Alternatively, the one-byte data may store the attribute data of any number of pixels from 1 to 4.

As described above, the image combiner 424 generates the attribute data Pxx for each pixel in the master image as illustrated in FIG. 8, while combining the preprint image and the variable master image into the master image as illustrated in FIG. 5. The image combiner 424 may determine whether each pixel belongs to the drawing data of the preprint image or the variable master image, based on the density of each pixel. The variable master image and the preprint image, which are processed by the image combiner 424, are each 24-bit image data including 8-bit R image data, 8-bit G image data, and 8-bit B image data. When the image density expressed by 24-bit image data is higher than a predetermined density value, it is determined that the pixel belongs to the drawing data. Further, by determining whether the pixel comes from the preprint image or the variable master image, the image combiner 424 assigns the "preprint image ID bit" or the "variable master image ID bit", with the value "1".

After the master image is generated by the master image generator 402, the inspection controller 403 instructs the comparator 404 to match the positions between the read image and the master image to compare the read image with the master image. More specifically, in this example, the comparator 404 matches the position of the read image with respect to the preprint image, and the position of the read image with respect to the variable master image, respectively, based on the attribute data that is generated. By matching the position of the read image to the preprint image and the position of the read image to the variable master image, respectively, the position of the read image can be accurately adjusted even in case the registration shift occurs in the printed image from which the read image is generated.

Figure 9:
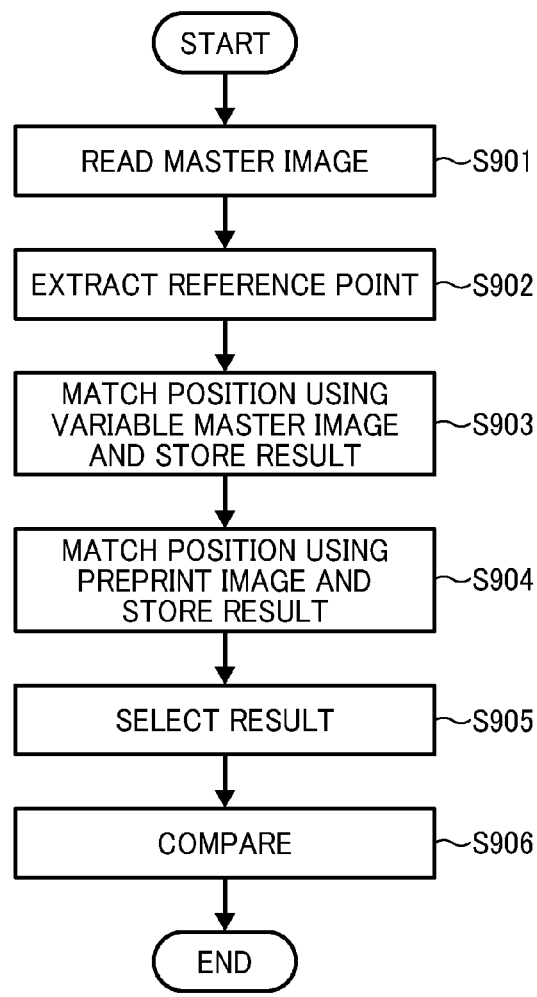
FIG. 9 is a flowchart illustrating operation of inspecting a read image, performed by the inspection apparatus of FIG. 3, according to an example embodiment of the present invention.

Referring now to FIG. 9, operation of inspecting the read image, performed by the comparator 404, is explained according to an example embodiment of the present invention.

At S901, the comparator 404 obtains the master image from the inspection controller 403, which is generated by the master image generator 402. For example, the master image may be stored in any desired memory in a manner that is accessible by the comparator 404, under control of the inspection controller 403.

At S902, the comparator 404 extracts a reference point in the master image. In this example, the reference point is one or more pixels that serve as a reference, such as a reference point or reference location, in the process of matching the position of the images such as the master image and the read image. For example, the master image may be provided with a specific graphical pattern called a print marker. Based on the print marker in master image, and the position in the read image that is assumed to include the print marker, the comparator 404 may specify an area for searching the print marker in the read image. Through pattern matching, the comparator 404 may find out the print marker in the read image that corresponds to the print marker in the master image, and extracts the position of the print marker in the read image as the reference point to be compared with the reference point (the print marker) in the master image.

Alternatively, the comparator 404 may detect an edge of the master image using an edge detection filter such as a Laplacian filter, or detect a corner of the master image using a corner detection filter. The extracted edge or corner of the master image may be extracted as the reference point, which is to be compared with the edge or corner of the read image that is extracted using a filter in a substantially similar manner.

The comparator 404 starts comparing the position of the read image with respect to the master image so as to match the positions between the read image and the master image, using the reference point extracted at S902.

At S903, the comparator 404 matches the position of the read image based on the variable master image, and stores a position match result based on the variable master image in any desired memory such as the RAM 20.

At S904, the comparator 404 matches the position of the read image based on the preprint image, and stores a position match result based on the preprint image in any desired memory such as the RAM 20.

S903 and S904 may be performed in any order, or performed concurrently.

Referring now to FIG. 10, operation of matching the position of the read image based on the variable master image or the preprint image is explained according to an example embodiment of the present invention.

FIG. 10 illustrates a portion of the master image, which includes a window "W" having a predetermined size. The window "W", which may be referred to as a matching pattern to be used for pattern matching, is an image section having the reference point "O" extracted at S902 in its center. FIG. 10 further illustrates a portion of the read image, which corresponds to the portion of the master image shown at left. In the process of matching the position of the read image, the comparator 404 uses the window "W" extracted from the master image as a matching pattern to search through a predetermined search area "R" in the read image for any portion that matches the matching pattern "W" while moving the matching pattern "W" in any direction within the search area "R". The search area "R" is an area of a predetermined size, which has the window "W" that corresponds to the matching pattern "W" in the master image in its center. In FIG. 10, the matching pattern "W" is moved in the direction of upper right from the initial position of the matching pattern "W".

Through pattern matching, the comparator 404 calculates, for each pixel in a matching pattern "W" in the search area "R" of the read image, the difference in density value with respect to the corresponding pixel in the matching pattern "W" in the master image. This calculation of the difference in pixel density in the matching pattern "W" is performed, while moving the matching pattern "W" in the vertical and horizontal directions, one pixel by one pixel, in the search area "R". For example, the comparator 404 may calculate the sum of the differences in pixel value in each matching pattern "W" in the read image with the matching pattern "W" in the master image, to obtain the difference in pixel density for each matching pattern in the read image. When the calculation result, that is, the difference in pixel density, is 0 or close to 0, the comparator 404 determines that the patterns match between the read image and the master image. In the read image illustrated in FIG. 10, it is assumed that the matching pattern that is located at the position corresponding to the position in the master image at which the matching pattern having the reference point "O" at its center is located, has the difference in pixel density that is the smallest, such as the value close to 0.

However, if a registration shift occurs while forming the image in the recording sheet at the print processor 301, a positional shift may occur between the preprint image and the variable image. In such case, the matching pattern in the master image generated by combining the preprint image and the variable image, and the matching pattern in the read image, may not correspond to each other. In view of this, in this example, the comparator 404 performs pattern matching on the read image with respect to the preprint image, and pattern matching on the read image with respect to the variable master image, respectively, by referring to the attribute data Pxx.

More specifically, to match the position of the read image with respect to the preprint image, the comparator 404 calculates the difference between the pixel value in the read image and the pixel value in the preprint image, only for the pixels with the attribute data Pxx having the preprint image ID bit of "1". The other pixels are unprocessed. Through only using the pixels with the attribute data Pxx having the preprint image ID bit of "1", the pixel positions of the read image can be adjusted with respect to the pixels included in the drawing data of the preprint image, thus matching the positions between the read image and the preprint image.

To match the position of the read image with respect to the variable master image, the comparator 404 calculates the difference between the pixel value in the read image and the pixel value in the variable master image, only for the pixels with the attribute data Pxx having the variable master image ID bit of "1". The other pixels are unprocessed. Through only using the pixels with the attribute data Pxx having the variable master image ID bit of "1", the pixel positions of the read image can be adjusted with respect to the pixels included in the drawing data of the variable master image, thus matching the positions between the read image and the variable master image.

Through performing correction of the positional shift in the read image, respectively, using the preprint image and the variable master image, the pixel positions of the read image can accurately be corrected even if the preprint image and the variable image do not match with each other due to the registration shift in the read image. As described above, in this example, the comparator 404 performs the function of matching the position of the read image, respectively, with respect to the preprint image and the variable image.

Referring now to FIG. 11, example operation of performing pattern matching, respectively, on the preprint image and the variable master image, is explained. FIG. 11 illustrates an enlarged section of the image specified by the window "W" in the master image, at the left. The master image section is generated by combining a preprint image section illustrated at the center of FIG. 11, and a variable master image section illustrated at the right of FIG. 11. The preprint image section includes a part of a line, or a frame, which may be extracted from the master image section by referring to the pixel having the attribute data Pxx of preprint image ID bit of "1". Based on comparison between the preprint image section and the read image section, the pixel positions of the read image section can be adjusted with respect to the corner of the frame in the preprint image section.

The variable master image section includes a part of characters or numerals being displayed within the frame when output, based on assumption that the entire preprint image is a form such as the frame. The variable master image section may be extracted from the master image section by referring to the pixel having the attribute data Pxx of the variable master image ID bit of "1". Based on comparison between the variable master image section and the read image section, the pixel positions of the read image section can be adjusted with respect to the part of the character in the variable master image section.

The comparison result between the read image and the preprint image, and the comparison result between the read image and the variable master image, are stored in a memory such as the RAM 20, as the result of matching the position of the read image with respect to the preprint image ("the position match result based on the preprint image"), and the result of matching the position of the read image with respect to the variable master image ("the position match result based on the variable master image"). For example, the position match results may be stored in a data structure as illustrated in FIG. 12.

Further, as described above referring to FIG. 10, the matching pattern having the smallest difference value in pixel density with respect to the matching pattern of the master image is selected from the search area "R" to generate the position match result. Accordingly, the position match result includes the smallest difference value for each one of matching based on the preprint image, and matching based on the variable master image. The difference value thus may be used as a value to reflect the accuracy in matching the position.

Referring to FIG. 12, the position match result based on the preprint image includes at least the difference value of the matching pattern in the read image having the smallest difference value with respect to the matching pattern of the preprint image. The position match result based on the variable master image includes at least the difference value of the matching pattern in the read image having the smallest difference value with respect to the matching pattern of the variable master image.

After completing operation of matching the position of the read image using the variable master image at S903, and using the preprint image at S904, the operation further proceeds to S905. At S905, the comparator 404 selects one of the position match results obtained at S903 and S904, respectively. In this example, based on assumption that a smaller difference value reflects the increased accuracy in matching the position of the image, the comparator 404 selects one of the position match results having the smaller difference value.

At S906, the comparator 404 adjusts the position of the read image with the master image, using the position match result selected at S905, and compares the pixel positions of the read image with those of the master image. More specifically, the comparator 404 compares between the master image and the read image to output a differential image. The comparator 404 obtains the difference in pixel value between the pixel in the master image and the corresponding pixel in the read image, and generates the differential image having the pixel value determined based on the difference.

If the printed image is accurately formed at the right position on the recording sheet, and operation of adjusting the position of the read image with the master image is successfully performed, there should be no difference or little difference in pixel value between the master image and the read image. In such case, the pixels in the read image and the pixels in the master image should have substantially the same results in terms of halftone values such that the difference should be nearly zero. On the other hand, if the image is not formed at the right position on the recording sheet, the pixels in the read image should differ from the pixels in the master image in terms of halftone values, such that the difference is not zero.

The comparator 404 detects a defect in the read image based on the differential image, or the difference value, by comparing the difference value with a predetermined threshold. In one example, a threshold value may be set for each one of the R plane, G plane, and B plane of the image data. In such case, the difference value is compared with the threshold value for each of the colors of R, G, and B. In another example, the comparator 404 may calculate the color shift entirely in brightness, tone, and hue, based on the differences obtained from the R, G, and B planes. Based on comparison between the color shift with a predetermined value, the comparator 404 may determine a defect in the read image. When it is determined that the difference value exceeds the predetermined value, the comparator 404 determines that there is a defect in the read image.

As described above, in this example, the inspection apparatus 4 generates attribute data indicating whether each pixel in the master image belongs to drawing data of the preprint image, or to drawing data of the variable image, while combining the preprint image and the variable image into the master image. Using the attribute data, the inspection apparatus 4 is able to determine whether a specific pixel in the master image corresponds to the drawing data of the preprint image or to the drawing data of the variable image. With the attribute data, it would be not necessary to respectively store the preprint image and the variable image, thus reducing the required memory area or size. Further, the inspection apparatus 4 is able to correct the position of the read image that is printed through preprint printing, with improved efficiency and accuracy.

As described above, if a registration shift occurs in the read image, the position of the preprint image with respect to the variable image is shifted, such that the read image differs from the master image. In the example operation described above referring to FIG. 9, since only one of the position match result based on the preprint image or the position match result based on the variable master image is used, the image corresponding to the unselected result remains shifted. Thus, the difference value is obtained from the image having the pixels that are shifted.

In such case, a threshold value used for determination of a defect may be adjusted. More specifically, the position of the read image is adjusted so as to match the position of one of the preprint image or the variable master image. If there is no defect in the read image, the difference value would be small. By setting a threshold value that takes into account the difference value calculated based on the difference between the read image and the other one of the preprint image or the variable master image, the influence due to the registration shift would not affect the determination of whether a defect is detected in the read image.

Further, when the optical character recognition (OCR) is used to generate the read image for comparison with the master image, the reading result, i.e., the read image would not be so much affected by the registration shift in the printed image.

Further, in the above-described example, at S902 of FIG. 9, it is assumed that the comparator 404 extracts a reference point using any desired method. Since the variable image differs, from page to page, in terms of its position being displayed or the contents being displayed, the reference point may not always be extracted from the same position in the image. On the other hand, the preprint image contains a predetermined format, which remains unchanged. Based on this assumption, it would be preferable to extract the reference point from the preprint data, thus improving the accuracy in position matching for all pages of the read image.

More specifically, at S902 of FIG. 9, the comparator 404 extracts a reference point from only the pixels with the attribute data Pxx having the preprint image ID bit of "1", in the master image. As a result, the reference point is extracted from the preprint image.

As described above referring to FIG. 10, at S903 and S904, the comparator 404 extracts an image pattern having a reference point at its center from the master image, and further extracts a corresponding image pattern from the read image by pattern matching. These extracted image patterns are used to adjust the position of the read image with respect to the master image. In this example, the image pattern having the smallest difference value is extracted from the read image, with respect to the corresponding image pattern in the master image, thus serving as the reference positions used for adjusting the positional shift.

Alternatively, if there is no image pattern, in the read image, which has a difference value lower than a threshold value, the comparator 404 may determine that there is a matching error. This can be effective when there is a defect in an image pattern that is extracted from a portion near the reference point. In case there is a defect in a section surrounding the reference point in the read image, the image pattern is not extracted by pattern matching as there is no image pattern that matches the image pattern extracted from the master image, thus outputting relatively a large difference value. In such case, unless the large difference value is excluded, the image pattern having the large difference value may be extracted as the image pattern having the minimum difference value. The position of the read image thus cannot be correctly matched with the master image.

In view of the above, the comparator 404 may only extract the image pattern having the difference value that is lower than the threshold value, such that the image pattern with the large difference value due to the defect can be eliminated. When the matching error is output, the operation of FIG. 9 may end in error without performing S905 and S906. In this manner, the comparator 404 is able to detect a defect in the read image with improved speeds.

Further, the reference point may be extracted from any one of the edge portions A to F of the image, for example, as illustrated in FIG. 13. The reference point extracted from the edge portion may function as a scale used for correcting the pixel positions of the printed image, for example, due to shrinking. For example, the recording sheet having the printed image formed thereon may shrink in size in the process of printing, such as in the process of being fixed by heat and pressure. While it would be preferable to extract the reference point from the pixel with the attribute data Pxx having the preprint image ID bit of "1", in case the pixel with the attribute data Pxx having the preprint image ID bit of "1" is not included in any one of the edge portions A to F, the comparator 404 may extract the pixel with the attribute data Pxx having the variable master image ID bit of "1".

Figure 14:
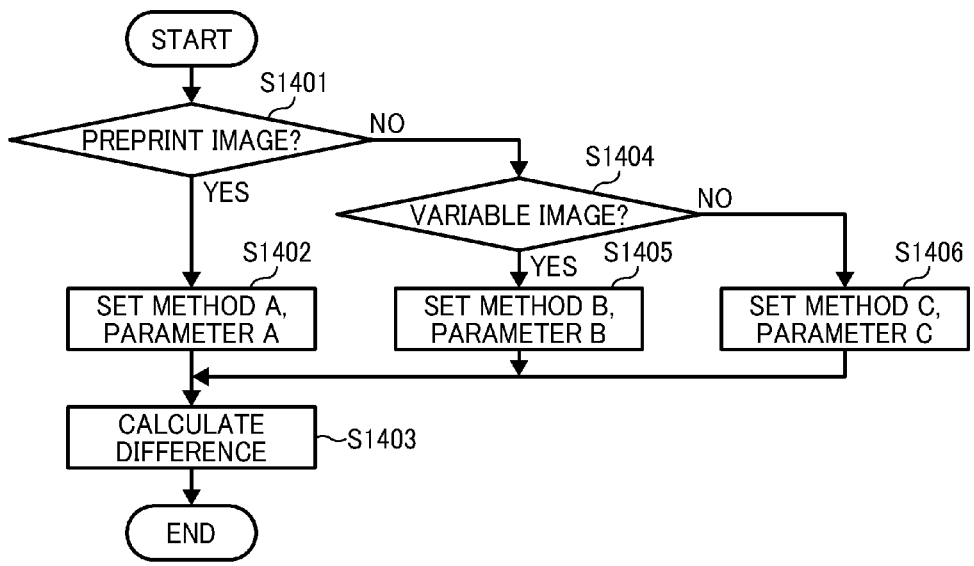
FIG. 14 is a flowchart illustrating operation of inspecting a read image, performed by the inspection apparatus of FIG. 3, according to an example embodiment of the present invention.

Further, the contents to be inspected at S906 may be changed, based on the value of the preprint image ID bit or the variable master image ID bit in the attribute data Pxx. FIG. 14 is a flowchart illustrating operation of comparing the read image with the master image to inspect the read image, according to an example embodiment of the present invention.

At S1401, the comparator 404 refers to the attribute data Pxx for each pixel subjected for calculating the difference value, and determines whether the preprint image ID bit of the attribute data Pxx has the value "1". When it is determined that the preprint image ID bit has the value "1" ("YES" at S1401), the operation proceeds to S1402. At S1402, the comparator 404 sets a method A, which is an inspection method based on the preprint image, and a parameter A for the method A. At S1403, the comparator 404 calculates the difference value between the pixel value of the read image and the pixel value of the master image.

When it is determined that the preprint image ID bit of the attribute data Pxx does not have the value "1" ("NO" at S1401), the operation proceeds to S1404. At S1404, the comparator 404 determines whether the variable master image ID bit of the attribute data Pxx has the value "1". When it is determined that the variable master image ID bit has the value "1" ("YES" at S1404), the operation proceeds to S1405. At S1405, the comparator 404 sets a method B, which is an inspection method based on the variable master image, and a parameter B for the method B. At S1403, the comparator 404 calculates the difference value between the pixel value of the read image and the pixel value of the master image.

When it is determined that the preprint image ID bit does not have the value "1" ("NO" at S1401), and that the variable master image ID bit does not have the value "1" ("NO" at S1404), the operation proceeds to S1406. At S1406, the comparator 404 sets a method C, which is an inspection method designed for blank data, and sets a parameter C for the method C. At S1403, the comparator 404 calculates the difference value between the pixel value of the read image and the pixel value of the mater image.

For example, in order to detect a missing part in the read image, the read image may be inspected using the preprint image so as to detect a colorless pixel that is not present in the read image, but is present in the master image. More specifically, the comparator 404 uses the method A to obtain the difference value of the pixel, which is obtained by subtracting the pixel value of the master image from the pixel value of the read image.

In another example, in order to detect a stain, for example, in addition to the missing part, the read image may be inspected using the variable image so as to detect a colored pixel that is not present in the master image, but is present in the read image. More specifically, the comparator 404 uses the method B to obtain the difference value of the pixel, which is obtained by subtracting the pixel value of the read image from the pixel value of the master image. The method B, which is selected as the inspection method using the variable image, may be selected in addition to the method A in case there is a need for inspecting a stain in the read image.

In another example, in order to detect only a stain in the read image, the read image may be inspected using the blank data, by selecting the method C.

The parameters A to C are, for example, threshold values of the difference values respectively used for the methods A to C. The parameter A, which is a threshold value to be used for inspecting based on the preprint image, may be set to a lower value than that of the parameter B, which is a threshold value to be used for inspecting based on the variable image. In this manner, inspection based on the variable image can be performed to detect a defect with higher standards.

Further, in another example, it may be assumed that the preprint image is previously printed on the right position on the recording sheet. In such case, inspection for the preprint image may not be performed. Further, in another example, in order to inspect the read image using the variable image, only character recognition using OCR may be performed rather than comparing the pixel values between the read image and the master image for each pixel.

Further, in this example, the inspection apparatus 4 is able to inspect the read image, using the position match result based on the preprint image and the position match result based on the variable image, using the attribute data plane, without respectively storing the preprint image and the variable master image.

Figure 15:
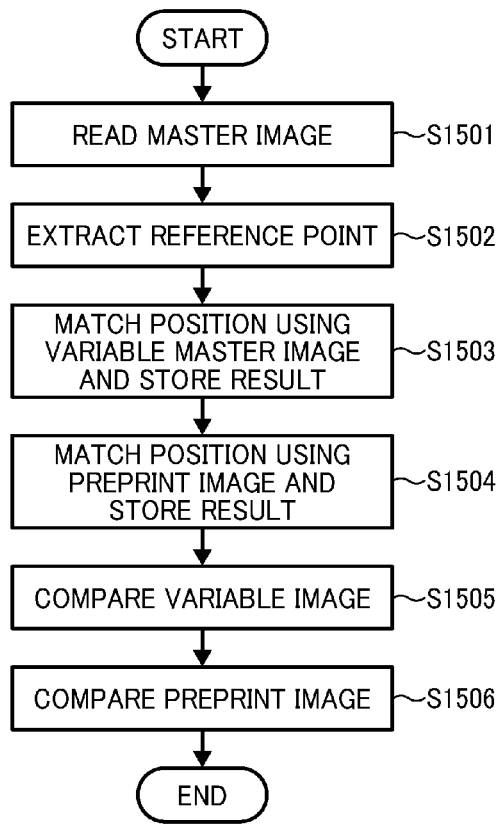
FIG. 15 is a flowchart illustrating operation of inspecting a read image, performed by the inspection apparatus of FIG. 3, according to an example embodiment of the present invention.

FIG. 15 is a flowchart illustrating operation of matching the position of the read image, respectively, with respect to the preprint image and the variable image, performed by the comparator 404, according to another example embodiment of the present invention.

S1501 to S1504 are performed in a substantially similar manner as described above referring to S901 to S904 of FIG. 9.

At S1505, the comparator 404 compares the read image with respect to the variable image. At S1506, the comparator 404 compares the read image with respect to the preprint image. S1505 and S1505 may be performed in any order, or performed in concurrently.

At S1505, in a substantially similar manner as described above referring to S906, the comparator 404 calculates the difference between the master image and the read image, based on the position match result obtained at S1503, specifically, the position match result generated based on the variable master image. Further, the comparator 404 calculates the difference in pixel value, for each pixel with the attribute data Pxx having the variable master image ID bit of "1".

At S1506, in a substantially similar manner as described above referring to S906, the comparator 404 calculates the difference between the master image and the read image, based on the position match result obtained at S1504, specifically, the position match result generated based on the preprint image. Further, the comparator 404 calculates the difference in pixel value, for each pixel with the attribute data Pxx having the preprint image ID bit of "1".

Through performing operation of FIG. 15, the inspection apparatus 4 is able to compare the read image with the variable image, based on the position match result obtained using the variable image, to detect a defect in the contents belonging to the variable image, without being affected by the preprint image. Further, the inspection apparatus 4 is able to compare the read image with the preprint image, based on the position match result obtained using the preprint image, to detect a defect in the contents belonging to the preprint image, without being affected by the variable image.

The inspection apparatus 4 cannot, however, inspect the blank portion of the read image by performing the operation of FIG. 15. In order to inspect the blank portion in the read image, which is not processed at S1505 or S1506, the inspection apparatus 4 may additionally perform the method C to inspect a stain in the read image as described above referring to FIG. 14. More specifically, the unprocessed pixels, which are not inspected at S1505 or S1506, are the pixels with the attribute data Pxx having the preprint image ID bit of "0" (other than "1") and the variable master image ID bit of "0" (other than "1"). However, if the pixels with the attribute data Pxx having the preprint image ID bit of "0" and the variable master image ID bit of "0" are adjusted based on different position match results as described above, the attribute data Pxx of the attribute data plane cannot be used to inspect the blank portion of the read image.

The unprocessed pixel is any pixel in the read image associated with the attribute data Pxx having the variable master image ID bit of "0" in a state at which the pixel positions of the read image are adjusted based on the position match result using the variable master image, and the attribute data Pxx having the preprint image ID bit of "0" in a state at which the pixel positions of the read image are adjusted based on the position match result using the preprint image. Through performing inspection of a stain as described above referring to FIG. 14, that is, extracting the colored pixel that is not present in the master image but present in the read image, the blank portion of the read image can be inspected.

More specifically, after completing the steps of S1503 and S1504, the comparator 404 may generate the attribute data Pxx of the read image, based on the attribute data Pxx of the variable master image and the attribute data Pxx of the preprint image, respectively. More specifically, for the pixel of the master image having the preprint image ID bit of "1", after matching the position between the master image and the read image based on the position match result at S1504, the attribute data Pxx of the corresponding pixel in the read image is caused to have the preprint image ID bit of "1". For the pixel of the master image having the variable master image ID bit of "1", after matching the position between the master image and the read image based on the position match result at S1503, the attribute data Pxx of the corresponding pixel in the read image is caused to have the variable master image ID bit of "1".

After adjusting the value of the attribute data Pxx to have the preprint image ID bit of "1" or the variable master image ID bit of "1", any pixel in the read image with the attribute data Pxx having the preprint image ID bit of "0" and the variable master image ID bit of "0" should correspond to the blank portion. In order to inspect the unprocessed pixels, that is, the blank portion of the read image, the comparator 404 can easily extract the pixels with the attribute data Pxx having the preprint image ID bit of "0" and the variable master image ID bit of "0".

In another example, the inspection apparatus 4 can switch the comparison result, that is, the inspection result, of the read image based on whether each pixel corresponds to the preprint image or the variable image. In such case, while displaying the pixels in the read image corresponding to the preprint image, the inspection apparatus 4 may cause the LCD 60 to display a message indicating that "there is a stain in the preprint image". While displaying the pixels in the read image corresponding to the variable image, the inspection apparatus 4 may cause the LCD 60 to display a message indicating that "there is a stain in the variable image".

In the above-described example, the inspection apparatus 4 calculates the difference in pixel value between the master image and the read image in RGB data format. If the RGB color space is used, there may be a difference in density recognition between the human eye and the actual numerical value calculated by the inspection apparatus 4, and that the degree of such difference varies between a high density range and a low density range. In order to detect a defect in the read image with the improved efficiency, different threshold values may be set respectively in the high density range and the low density range to compensate the difference in density recognition. Alternatively, the inspection apparatus 4 may calculate the difference in pixel value between the master image and the read image in Lab data format, for example, after converting the color space from RGB to Lab. With the Lab, the threshold value to compensate the difference in density recognition may be set uniform through all density ranges.

In the above-described example, it is assumed that the read image subjected for inspection is the printed image that is printed on the recording sheet having the preprint image. The above-described method of generating the attribute data Pxx and inspecting using the attribute data Pxx may be applicable to the case in which the read image subjected for inspection is a printed image that is printed on a recording sheet having no previously printed image, that is, a blank recording sheet such as white paper. In such case, while generating the master image based on the image to be printed, the inspection apparatus 4 generates, for each colored pixel in the image to be printed, attribute data indicating that the pixel belongs to at least a part of information to be formed, or displayed when output. The attribute data may contain one bit of information for each pixel.

The inspection apparatus 4 further refers to the attribute data to compare between the master image and the read image. More specifically, the comparator 404 of the inspection apparatus 4 compares only the pixels having the attribute data indicating that the pixel belongs to the part of the information to be formed, to output an inspection result. This reduces the overall time required for calculating the comparison result. Especially in case of inspecting an image having mainly characters with a large area of blank space, the inspection processing time can be greatly reduced.

Further, in the above-described example, as illustrated in FIG. 8, the attribute data is 2-bit data. Alternatively, the attribute data may be set as one bit data, which indicates whether the pixel belongs to the variable image or the preprint image. More specifically, in such case, the entire read image including the blank space is set as the value "0" indicating that the pixel belongs to the preprint image. Any pixel belonging to the variable image is then set to have the attribute data value of "1".

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in an image inspection apparatus that inspects a read image generated by a reading device, the read image being generated by reading an image formed by an image forming apparatus on a recording sheet having a preprint image. The image inspection apparatus includes: an inspection image generator that obtains an output target image reflecting an image to be output by the image forming apparatus and a preprint image that is an image previously printed on the recording sheet, and generates an inspection image to be used for inspecting the read image by combining the output target image and the preprint image; an attribute data generator that generates attribute data for each pixel constituting the inspection image while generating the inspection image, the attribute data indicating whether the pixel is a part of data included in the output target image or a part of data included in the preprint image; a position match processor that performs first position match between the inspection image and the read image based on only the pixels being a part of data included in the output target image to generate a first position match result, and performs second position match between the inspection image and the read image based on only the pixels being a part of data included in the preprint image to generate a second position match result; and an image inspector that compares between the inspection image and the read image to inspect the read image, the inspection image and the read image being matched in their positions using at least one of the first position match result and the second position match result.

For example, the inspection image generator corresponds to the master image generator 402, which generates an inspection image such as a master image, by combining an output target image such as a variable master image, and a preprint image. The output target image is an image that reflects a variable image being formed by the image forming apparatus such as the print processor. The preprint image is an image that reflects a previously printed image on the recording sheet. The attribute data generator corresponds to the master image generator 402, such as the image combiner 424, capable of generating attribute data for each pixel in the master image, while generating the master image. The position match processor corresponds to the comparator 404, which generates a position match result based on the variable master image and a position match result based on the preprint image. The image inspection corresponds to the comparator 404, which compares between the master image and the read image, after adjusting the position of the read image with respect to the master image based on at least one of the position match results. The master image generator 402 and the comparator 404 may each be implemented by a processing circuit such as the specialized device 80, or a processor such as the CPU 10 that executes software stored in a memory such as the RAM 20.

For example, the position match processor extracts at least one reference point in the inspection image. In the first position match, the position match processor searches an image section in the read image, which surrounds a pixel corresponding to the reference point, for only the pixels being a part of data included in the output target image. The searched image section is used to match positions between the inspection image and the read image. In the second position match, the position match processor searches an image section in the read image, which surrounds a pixel corresponding to the reference point, for only the pixels being a part of data included in the preprint image. The searched image section is used to match positions between the inspection image and the read image. For example, the searched image section in the read image may be referred to a pattern matching area, which is selected through pattern matching performed on the read image using a pattern matching area in the master image.

The position match processor extracts the reference point from the inspection image, specifically, from the pixels being a part of data included in the preprint image.

In another example, the position match processor compares a plurality of pixels in a pattern matching area in the inspection image, with the corresponding pixels in the read image, to calculate the difference in pixel value for each one of the pixels and obtains the sum of the difference values in the pattern matching area, while changing the pattern matching area to be compared. The position match processor further selects the pattern matching area having the smallest sum of the difference values as a position match result. The position match processor further stores the smallest sum of the difference values in a memory as information indicating the accuracy in position match. The image inspector selects one of the first position match result or the second position match result, based on the information indicating the accuracy in position match. In this example, the sum of the pixels may reflect the pixel density of the pattern matching area.

In another example, the image inspector compares between the inspection image and the read image while applying the first position match result, for the pixels being a part of data included in the output target image in the inspection image.

In another example, the image inspector compares between the inspection image and the read image while applying the second position match result, for the pixels being a part of data included in the preprint image in the inspection image.

In another example, the image inspector inspects blank pixels in the read image, other than the pixels being a part of data included in the output target image and the pixels being a part of data included in the preprint image. The pixels being a part of data included in the output target image is processed by the image inspector while applying the first position match result. The pixels being a part of data included in the preprint image is processed by the image inspector while applying the second position match result.

In another example, the inspection apparatus generates attribute data indicating that the pixel belongs to a part of data included in the output target image, for each one of the pixels in the read image to be compared with the pixels belonging to a part of data included in the output target image in the inspection image, based on the first position match result. The inspection apparatus generates attribute data indicating that the pixel belongs to a part of data included in the preprint image, for each one of the pixels in the read image to be compared with the pixels belonging to a part of data included in the preprint image in the inspection image, based on the second position match result.

In another example, the present invention may reside in an image inspection method of inspecting a read image generated by a reading device, the read image being generated by reading an image formed by an image forming apparatus on a recording sheet having a preprint image. The image inspection method includes: obtaining an output target image reflecting an image to be output by the image forming apparatus and a preprint image that is an image previously printed on the recording sheet; generating an inspection image to be used for inspecting the read image by combining the output target image and the preprint image, the inspection image being stored in a memory; generating attribute data for each pixel constituting the inspection image while generating the inspection image, the attribute data indicating whether the pixel is a part of data included in the output target image or a part of data included in the preprint image, the attribute data being stored in a memory; performing first position match between the inspection image and the read image based on only the pixels being a part of data included in the output target image to generate a first position match result, the first position match result being stored in the memory; performing second position match between the inspection image and the read image based on only the pixels being a part of data included in the preprint image to generate a second position match result, the second position match result being stored in the memory; and comparing between the inspection image and the read image to inspect the read image, the inspection image and the read image being matched in their positions using at least one of the first position match result and the second position match result.

In another example, the present invention may reside in an image inspection apparatus that inspects a read image generated by a reading device, the read image being generated by reading an image formed by an image forming apparatus on a recording sheet. The image inspection apparatus includes: an inspection image generator that obtains an output target image that reflects an image to be output by the image forming apparatus to generate an inspection image to be used for inspecting the read image; an attribute data generator that generates attribute data for each pixel constituting the inspection image while generating the inspection image, the attribute data indicating whether the pixel is a part of data included in the output target image; and an image inspector that compares between the inspection image and the read image for only the pixels being the part of the data included in the output target image in the inspection image, by referring to the attribute data, to inspect the read image.

What is claimed is:

1. An image inspection apparatus that inspects a printed image formed by a variable image printed onto a recording sheet having a pre-existing image, the apparatus comprising a processor configured to:

obtain (a) a read image that was generated by scanning the printed image constituted by the variable image and the pre-existing image on the recording sheet and (b) a preprint image that was generated by scanning another recording sheet containing the pre-existing image without the variable image;

generate an output target image based on image data corresponding to the variable image;

combine the preprint image and the output target image to generate an inspection image and, while generating the inspection image based on combination of the preprint image previously printed on the recording sheet and the output target image, generate attribute data for each one of a plurality of pixels in the inspection image, the attribute data indicating whether the pixel corresponds to drawing data in the output target image or to drawing data in the preprint image previously printed on the recording sheet;

match the positions between the read image and the inspection image for only the pixels corresponding to the drawing data in the output target image to generate a first position match result;

match the positions between the read image and the inspection image for only the pixels corresponding to the drawing data in the preprint image to generate a second position match result; and compare between the inspection image and the read image to inspect the read image, the inspection image and the read image being matched in positions using at least one of the first position match result and the second position match result.

2. The image inspection apparatus of claim 1, wherein the processor is further configured to:

extract at least one reference point in the inspection image;

extract a first section of the read image, which includes a plurality of pixels surrounding a pixel corresponding to the extracted reference point in the inspection image, the plurality of pixels being a part of the pixels corresponding to the drawing data in the output target image, wherein the extracted first section is used to generate the first position match result; and extract a second section of the read image, which includes a plurality of pixels surrounding a pixel corresponding to the extracted reference point in the inspection image, the plurality of pixels being a part of the pixels corresponding to the drawing data in the preprint image, wherein the extracted second section is used to generate the second position match result.

3. The image inspection apparatus of claim 2, wherein the processor extracts the reference point from the pixels of the inspection image that correspond to the drawing data in the preprint image.

4. The image inspection apparatus of claim 2, wherein the first section of the read image and the second section of the read image are respectively obtained by selecting one of a plurality of pattern matching areas in the read image that matches a pattern matching area in the inspection image.

5. The image inspection apparatus of claim 4, wherein the processor is further configured to:

calculate, for each one of the plurality of pattern matching areas in the read image to be compared with the pattern matching area in the inspection image, a difference value in pixel density between a plurality of pixels included in the pattern matching area in the read image and a plurality of pixels included in the pattern matching area in the inspection image;

select one of the plurality of pattern matching areas in the read image having the smallest difference value, respectively, as the first section of the read image and the second section of the read image; and store the difference values of the first section of the read image and the second section of the read image, respectively, as a part of the first position match result and a part of the second position match result.

6. The image inspection apparatus of claim 5, wherein the processor is further configured to:

select one of the first position match result or the second position match result, based on the difference value.

7. The image inspection apparatus of claim 1, wherein the processor is further configured to:

adjust the position of the read image with respect to the output target image based on the first position match result;

adjust the position of the read image with respect to the preprint image based on the second position match result; and extract pixels corresponding to a blank portion in the read image whose position is adjusted, by excluding the pixels corresponding to the drawing data of the output target image and the pixels corresponding to the drawing data of the preprint image, respectively, from the read image.

8. The image inspection apparatus of claim 1, wherein the processor is further configured to, update the attribute data so as to indicate that the pixel corresponds to drawing data in the output target image or to drawing data in the preprint image, after adjusting the position of the read image based on the first position match result or the second position match result.

9. The image inspection apparatus of claim 1, wherein the attribute data includes:

one-bit data indicating whether the pixel corresponds to drawing data in the output target image; and one-bit data indicating whether the pixel corresponds to drawing data in the preprint image.

10. The image inspection apparatus of claim 1, further comprising:

a memory configured to store the attribute data in association with the inspection image.

11. An image forming system, comprising:

an image forming device configured to form the printed image on the recording sheet, the printed image being read by a reading device as the recording sheet is transferred from the image forming device to the image inspection apparatus; and the image inspection apparatus of claim 1.

12. An image inspection method of inspecting a printed image formed by a variable image printed onto a recording sheet having a pre-existing image, the image inspection method comprising:

obtaining (a) a read image that was generated by scanning the printed image constituted by the variable image and the pre-existing image on the recording sheet and (b) a preprint image that was generated by scanning another recording sheet containing the pre-existing image without the variable image;

generating an output target image based on image data corresponding to the variable image;

combining the preprint image and the output target image to generate an inspection image and, while generating the inspection image based on combination of the preprint image previously printed on the recording sheet and the output target image, generating attribute data for each one of a plurality of pixels in the inspection image, the attribute data indicating whether the pixel corresponds to drawing data in the output target image or to drawing data in the preprint image previously printed on the recording sheet;

matching the positions between the read image and the inspection image for only the pixels corresponding to the drawing data in the output target image to generate a first position match result;

matching the positions between the read image and the inspection image for only the pixels corresponding to the drawing data in the preprint image to generate a second position match result; and comparing between the inspection image and the read image to inspect the read image, the inspection image and the read image being matched in positions using at least one of the first position match result and the second position match result.

13. The image inspection method of claim 12, further comprising:
extracting at least one reference point in the inspection image;
extracting a first section of the read image, which includes a plurality of pixels surrounding a pixel corresponding to the extracted reference point in the inspection image, the plurality of pixels being a part of the pixels corresponding to the drawing data in the output target image, wherein the extracted first section is used to generate the first position match result; and
extracting a second section of the read image, which includes a plurality of pixels surrounding a pixel corresponding to the extracted reference point in the inspection image, the plurality of pixels being a part of the pixels corresponding to the drawing data in the preprint image, wherein the extracted second section is used to generate the second position match result.

14. The image inspection method of claim 12, further comprising:
adjusting the position of the read image with respect to the output target image based on the first position match result;
adjusting the position of the read image with respect to the preprint image based on the second position match result; and
extracting pixels corresponding to a blank portion in the read image whose position is adjusted, by excluding the pixels corresponding to the drawing data of the output target image and the pixels corresponding to the drawing data of the preprint image, respectively, from the read image.

15. An image inspection apparatus that inspects a printed image formed by a variable image printed onto a recording sheet having a pre-existing image, the apparatus comprising a processor configured to:
obtain (a) a read image that was generated by scanning the printed image constituted by the variable image and the pre-existing image on the recording sheet, (b) a preprint image that was generated by scanning another recording sheet containing the pre-existing image without the variable image and (c) image data corresponding to the variable image;
generate an inspection image based on the read image and the variable image and, while generating the inspection image based on the printed image already previously printed on the recording sheet, generate attribute data for each one of a plurality of pixels in the inspection image, the attribute data indicating whether the pixel corresponds to drawing data in the inspection image generated based on the printed image already previously printed on the recording sheet; and
compare between the inspection image and the read image for only the pixels corresponding to the drawing data in the inspection image based on the attribute data to inspect the read image.

16. The image inspection apparatus of claim 1, wherein
in at least some instances, the image inspection apparatus matches the inspection image and the read image in positions using only the second position match result generated based on matching the positions between the read image and the inspection image for only the pixels corresponding to the drawing data in the preprint image.

* * * * *